Patented Sept. 21, 1943

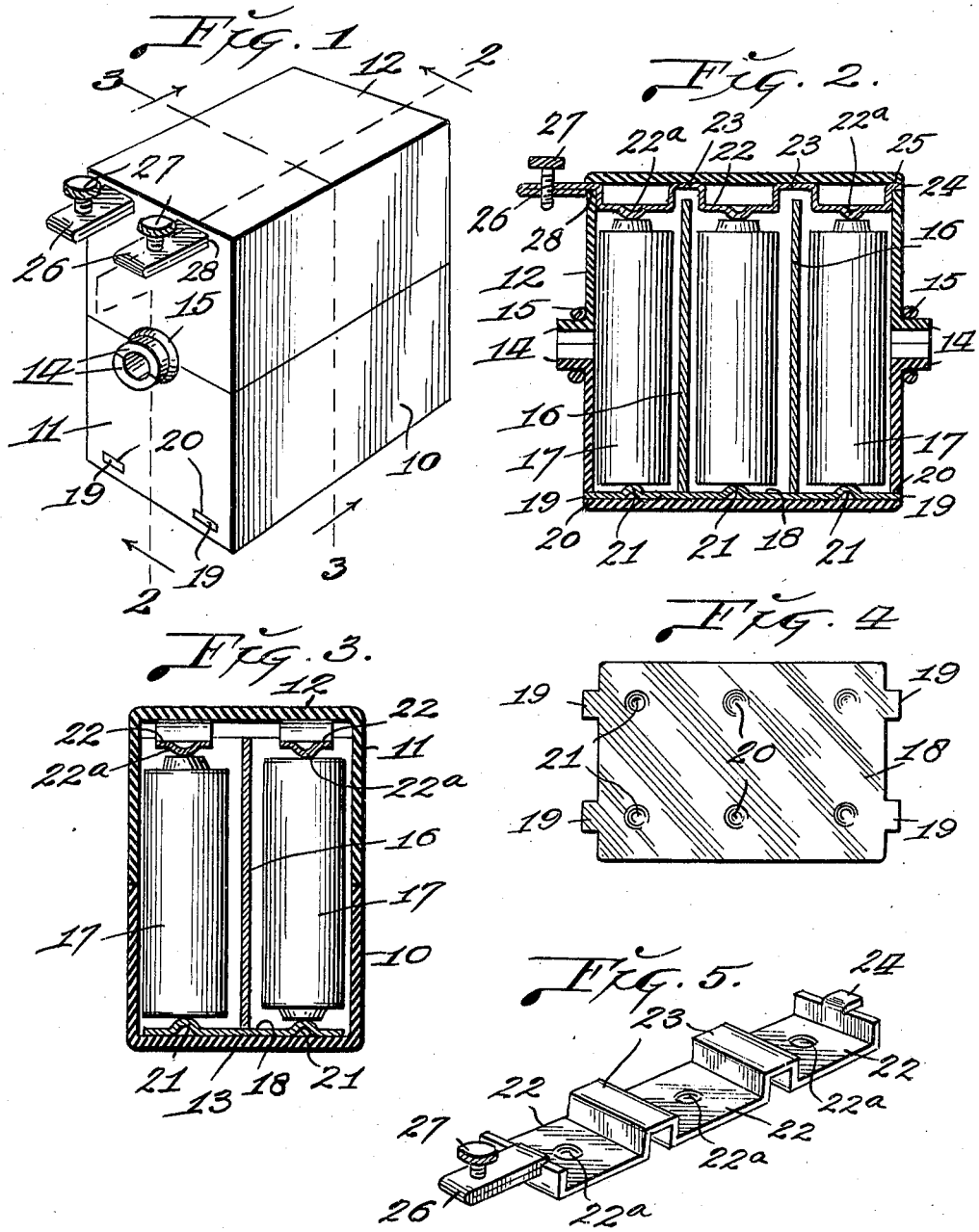

2,329,856

UNITED STATES PATENT OFFICE 2,329,856

BATTERY

Eduard Salathé, Los Angeles, and Melvin C. Farrell, Glendale, Calif.

Application May 29, 1941, Serial No. 395,844

1 Claim. (Cl. 136—173)

Our invention relates to a multiple cell battery and has for its principal object, the provision of a relatively simple, practical, and compact battery, including a box or container and a plurality of conventional dry cells that may be advantageously employed in connection with the ignition systems of the small internal combustion engines used as motive power for miniature airplanes or for any purpose where it is desired to increase or decrease the amperage capacity of a constant voltage current.

Further objects of our invention are, to provide a strong and substantial, light weight battery box or container adapted to receive a plurality of cells and the construction of said box or container being such as to permit the ready insertion and removal of the battery cells and the partitions between said cells, and further, to construct the battery box and the contact plates and strips so that the latter may be conveniently positioned within or removed from the box.

With the foregoing and other objects in view, our invention consists in certain novel features of construction and arrangement of parts that will be hereinafter more fully described and claimed and illustrated in the accompanying drawing in which:

Fig. 1 is a perspective view of a battery box constructed in accordance with our invention.

Fig. 2 is a vertical longitudinal section taken approximately on the line 2—2 of Fig. 1.

Fig. 3 is a cross section taken on the line 3—3 of Fig. 1.

Fig. 4 is a plan view of the contact plate that is located in the bottom of the battery box or container.

Fig. 5 is a perspective view of one of the contact and conductor strips that is located in the top of the box.

As illustrated in the drawing, the battery box is composed of practically identical halves, rectangular in form, and each part including a pair of side walls 10 and a pair of end walls 11. The upper part of the box includes a top plate or wall 12 and the lower half includes a bottom plate or wall 13. The parts of the box may be formed from any suitable insulation, for instance, wood, compressed fiber, or chip board, or from any of the various plastics now in general use.

Formed integral with the end walls 11 adjacent the edges that contact with each other when the parts of the box are properly assembled are outwardly projecting semi-circular lugs 14 that combine to form short circular studs and removably positioned thereon are rings 15 of elastic material or split rings of metal that serve to retain the parts of the box in assembled relation.

Removably positioned within the box or container are partitions 16 that provide separate chambers for the inserted battery cells 17, which latter are of conventional construction and readily obtainable in the open market.

Removably positioned within the lower part of the chamber within the box and resting upon the bottom plate 13 is a substantially rectangular plate 18 of thin, resilient metal, and formed integral with the ends thereof are short outwardly projecting lips 19, which when the plate is inserted in the box project into correspondingly shaped apertures 20 that are formed in the end walls of the lower half of the box directly above the bottom 13 thereof.

The construction just described provides anchorage for the plate 18 when the same is inserted in the box and at the same time said plate may be readily removed from the box. Small portions of the plate 18 are pressed upwardly so as to form studs 21 that directly contact with the positive and negative contacts of the inserted battery cells.

Removably positioned within the upper portion of the box directly beneath the top 12 thereof is a pair of spaced longitudinally disposed contact strips 22 of thin, resilient metal, portions 23 of which intermediate their ends are extended upwardly to provide transversely disposed ribs which bear directly against the top plate or wall 12 of the box, and those portions of the strips between the upwardly extended portions 23 function as contacts for engagement with the positive and negative contacts of the inserted battery cells.

Portions of the metal at the centers of the members 22 are pressed downwardly as designated by 22a, thereby providing contacts for engaging the ends of the inserted batteries.

Projecting from one end of each strip 22 is a lip 24 which, when the strip is properly positioned in the box, occupies a slot or opening 25 that is formed in the end wall 11 immediately adjacent the end of the top wall or plate 12. Projecting from the opposite end of each strip 22 is a strip of metal that is bent double to form a terminal 26 and seated therein is a binding screw 27. The strips that form these terminals project through slots or openings 28 that are formed in the corresponding end wall 11 of the upper part of the box directly below the end of the top plate 12.

While we have shown our improved battery box constructed so as to receive six cells, it will be understood that boxes constructed in accordance with our invention may be produced for the accommodation of varying numbers of cells in order to bring about or develop a current of desired amperage capacity.

By removing the resilient rings 15 from the studs on the ends of the box, the parts thereof may be readily separated to permit the removal and insertion of battery cells, thereby providing for the production of a current of the desired amperage, and as the contact plate 18 and strips 22 are readily removable and replaceable the assembly of the box and its contents, as well as the disassembly thereof, may be easily and quickly accomplished.

Batteries constructed in accordance with our invention are particularly applicable for use in connection with the ignition systems of the small internal combustion engines utilized for driving miniature airplanes, for in addition to being very compact the weight of the battery may be readily increased or decreased by varying the number of cells placed in the battery and the battery properly weighted may be readily adjusted forwardly or rearwardly within the fuselage of the miniature airplane so as to provide perfect fore and aft balance for said fuselage. Obviously, the batteries may be made in various sizes to suit different needs and requirements.

Thus it will be seen that we have provided a battery and battery box or container that is relatively simple in construction, inexpensive of manufacture, and very effective in performing the functions for which it is intended.

It will be understood that minor changes in the size, form and construction of the various parts of our improved battery, may be made and substituted for those herein shown and described, without departing from the spirit of our invention, the scope of which is set forth in the appended claim.

We claim as our invention:

A battery comprising a box formed in two parts, readily releasable means for maintaining the parts of the box in assembled relation, a one-piece conductor plate removably positioned in the bottom of the box, lugs formed integral with the ends of said conductor plate, which lugs project through the end walls of the box, contacts projecting upwardly from said conductor plate, a pair of separately formed conductor strips removably positioned within the upper portion of the box, lugs on the ends of said conductor strips, which lugs project through the ends of the battery box, spaced transversely disposed ribs pressed from and projecting upwardly from said conductor strips, contacts projecting downwardly from said strips for bearing against the top of the box and battery cells located within said box with their ends in engagement with the contacts on said conductor plate and said conductor strips.

EDUARD SALATHÉ.
MELVIN C. FARRELL.